United States Patent [19]

Weiss

[11] Patent Number: 4,784,496

[45] Date of Patent: Nov. 15, 1988

[54] APPLIANCE FOR PREPARING MAYONNAISE AND SIMILAR SAUCES

[75] Inventor: Roger Weiss, Bagnolet, France

[73] Assignee: Moulinex, Societe Anonyme, Bagnolet, France

[21] Appl. No.: 8,933

[22] Filed: Jan. 21, 1987

[30] Foreign Application Priority Data

Jan. 30, 1986 [FR] France ................... 86 01288

[51] Int. Cl.⁴ .............................................. B01F 15/02
[52] U.S. Cl. ...................................... 366/162; 222/239
[58] Field of Search .............. 366/244, 245, 246, 247, 366/249, 251, 262, 293, 150, 154, 155, 156, 157, 160, 161, 162; 222/239

[56] References Cited

U.S. PATENT DOCUMENTS

| 2,503,878 | 4/1950 | Linn | 222/239 |
| 3,664,096 | 5/1972 | Le Jeune | 366/160 |
| 4,505,593 | 3/1985 | Miller | 366/160 |

Primary Examiner—Robert W. Jenkins
Attorney, Agent, or Firm—Young & Thompson

[57] ABSTRACT

An appliance for preparing mayonnaise and similar sauces has a reservoir for oil or otherl iquid mounted above the mixing bowl. A mixing tool is rotatable within the bowl by way of a driven shaft which extends vertically and is also arranged to drive a dispensing device for controlling the flow of liquid from the reservoir to the bowl. The dispensing device includes a gear type proportioning pump having a toothed wheel which transports oil or other liquid from an intake orifice in the bottom of the reservoir to a delivery orifice communicating with the bowl.

2 Claims, 2 Drawing Sheets

APPLIANCE FOR PREPARING MAYONNAISE AND SIMILAR SAUCES

BACKGROUND TO THE INVENTION

The present invention relates to an appliance for preparing mayonnaise and similar sauces.

French Pat. No. FR-A-1,092,758 describes an appliance comprising a work bowl in which a mixing tool is rotatable, the tool being fixed to a shaft driven about a vertical axis by a motor unit. An oil reservoir is supported above the bowl and communicates with this bowl by means of an oil-dispensing device. The oil-dispensing device consists of an adjustable tap. In this known appliance, the user can open the tap before starting the motor, and this can result in an excessive quantity of oil flowing from the reservoir into the egg yolk contained in the work bowl, and consequently in a failure in the preparation of the mayonnaise.

SUMMARY OF THE INVENTION

It is an object of the invention to reduce or even eliminate this disadvantage of the known appliance.

According to the present invention there is provided an appliance for preparing mayonnaise and similar sauces, comprising a work bowl, a mixing tool locatable within said work bowl, a rotatable shaft carrying said mixing tool and extending substantially vertically, and drive means for rotating said shaft about a vertical axis, the appliance further comprising a reservoir for oil or other liquid supported above said bowl, and a dispensing device providing communication for liquid between said reservoir and said work bowl, wherein said dispensing device comprises a proportioning pump driven by said rotary shaft and having an intake orifice which communicates with the reservoir and a delivery orifice which communicates with the work bowl, the pump being arranged to ensure that oil or liquid only flows into the bowl from the reservoir when the shaft is rotated.

With an appliance of the invention oil cannot flow into the egg yolk before the mixing tool is rotated.

BRIEF DESCRIPTION OF THE DRAWINGS

An embodiment of the present invention will hereinafter be described, by way of example, with reference to the accompanying drawings, in which.

DESCRIPTION OF A PREFERRED EMBODIMENT

Figure 1:
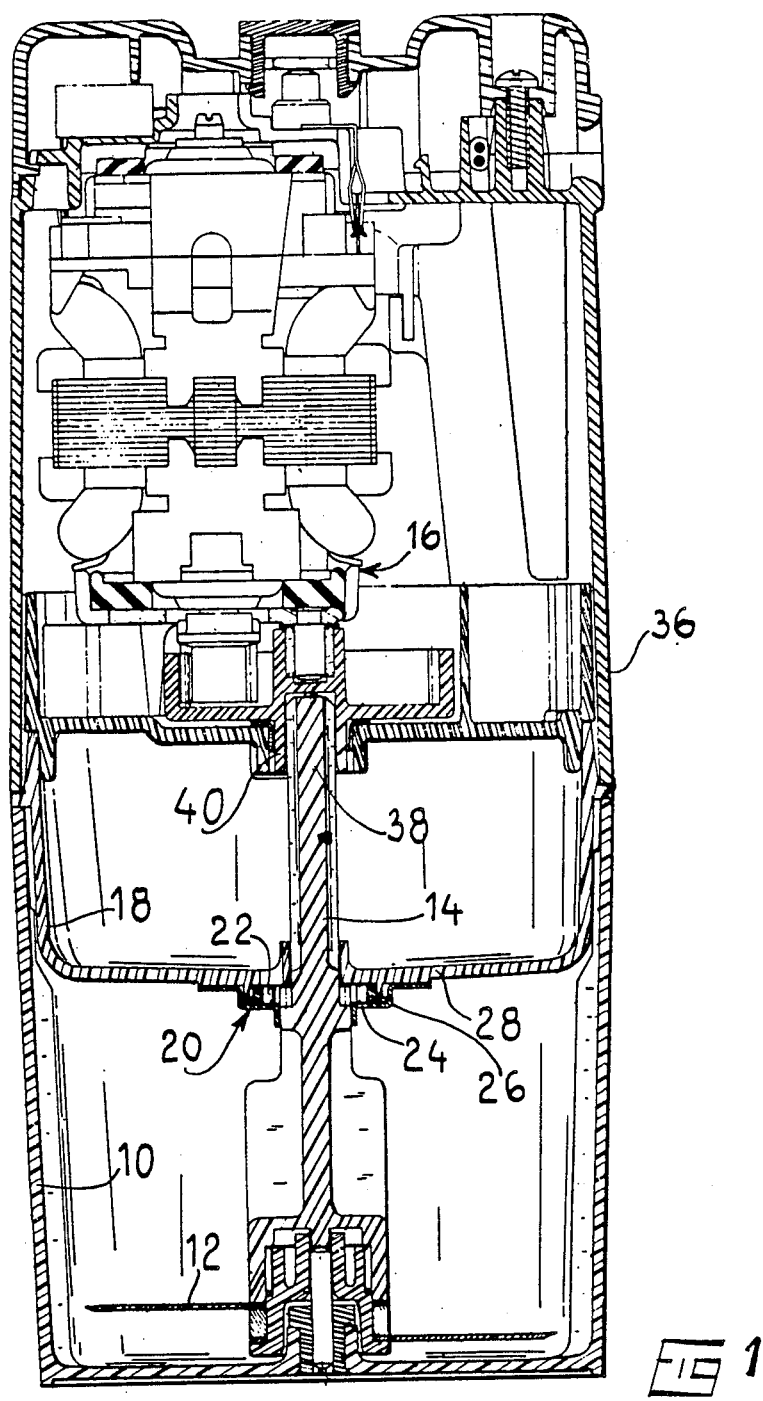
FIG. 1 is a view in vertical section of an appliance of the invention.

An appliance for preparing mayonnaise and similar sauces is illustrated in FIG. 1 and comprises a work bowl 10 in which a mixing tool 12 rotates. The tool 12 is fixed to a shaft 14 driven to rotate about a vertical axis by a motor unit 16. An oil reservoir 18 is supported above the bowl 10 and communicates with the bowl 10 by way of an oil-dispensing device 20.

The oil-dispensing device 20 includes a proportioning pump driven by the rotary shaft 14. An intake orifice 22 of the pump communicates with the reservoir 18, whilst its delivery orifice 24 communicates with the work bowl 10.

Figure 2:
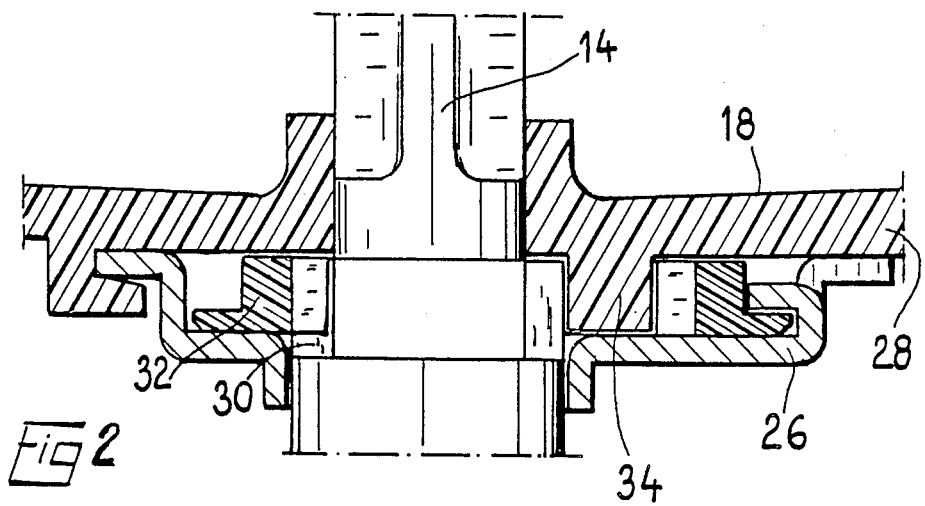
FIG. 2 shows a pump of the appliance of FIG. 1 on a larger scale and in section.
Figure 3:
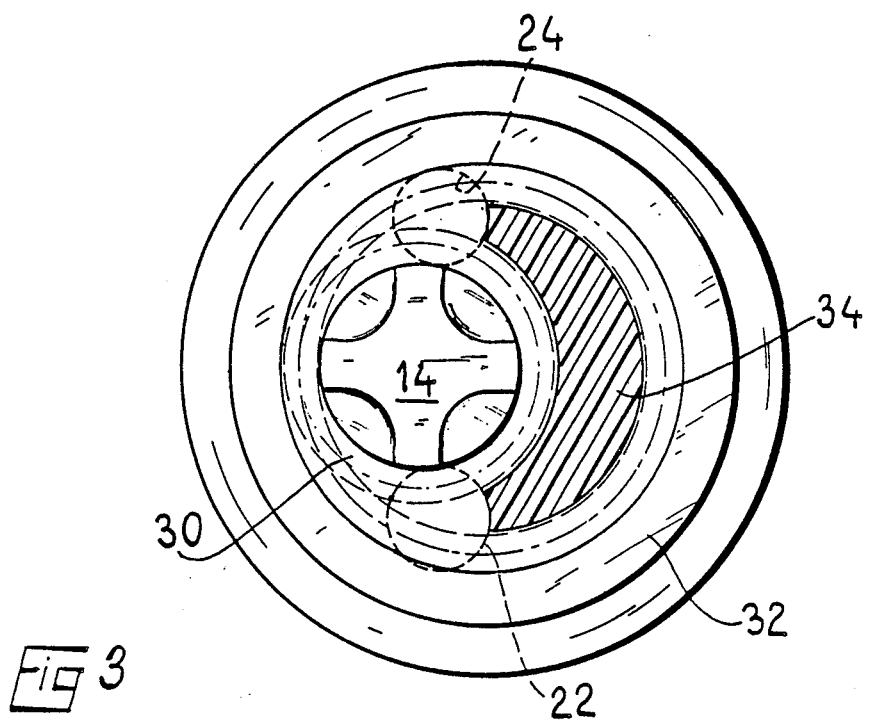
FIG. 3 is a plan view of essential components of the pump of FIG. 2.

The proportioning pump is a pump of the gear type and is contained within a housing 26 fastened under the bottom wall 28 of the reservoir 18. In FIG. 2, the pump comprises a first gear wheel 30 fixed to the shaft 14 and a second gear wheel 32 meshing with the first and mounted loosely in the housing 26. The intake orifice 22 and the delivery orifice 24 are formed respectively in the bottom wall 28 and in the housing 26.

The second gear wheel 32 is formed by an internally toothed eccentric ring which meshes with, and has a larger diameter than, the first wheel 30. The space between the two wheels 30 and 32 is filled by a crescent-shaped sector 34. The orifices 22 and 24 are located near to the ends of this sector 34.

To make mayonnaise using this appliance, the bowl is first removed therefrom and the egg yolk, salt and mustard are put into it. The shaft 14 equipped with the tool 12 and the reservoir 18 are then put into position relative to the bowl and this oil reservoir is filled with oil. The casing 36 of the motor unit 16 is then placed on the reservoir so that the upper end 38 of the shaft 14 is coupled to the output driver 40 of this motor unit.

The motor is then started. The pump 20 comes into operation. Oil, carried along by the teeth of the gears, then passes from the orifice 22 to the orifice 24 and flows uniformly into the bowl 10.

I claim:

1. An appliance for preparing mayonnaise and similar sauces, comprising a work bowl, a mixing tool locatable within said work bowl, a rotatable shaft carrying said mixing tool and extending substantially vertically, and drive means for rotating said shaft about a vertical axis, the appliance further comprising a reservoir for oil or other liquid supported above said bowl, and a dispensing device providing communication for liquid between said reservoir and said work bowl, said dispensing device comprising a proportioning pump driven by said rotary shaft and having an intake orifice which communicates with the reservoir and a delivery orifice which communicates with the work bowl, the pump being arranged to ensure that oil or liquid flows into the bowl from the reservoir only when the shaft is rotated, wherein said reservoir has a bottom wall in which said intake orifice is located, and further comprising a housing fastened under said bottom wall, the delivery orifice being located in said housing, and wherein said proportioning pump is a pump of the gear type and is contained within said housing, said pump comprising a first gear wheel fixed to the rotary shaft and a second gear wheel meshing with said first gear wheel and mounted loosely within the said housing.

2. An appliance according to claim 1, wherein said second gear wheel is formed by an internally toothed eccentric ring which meshes with, and has a larger diameter than, said first gear wheel, and wherein a crescent-shaped sector is located in the space defined between the two gear wheels, said intake and delivery orifices being located proximate the ends of the said sector.

* * * * *